United States Patent
Aeloiza et al.

(10) Patent No.: US 9,800,167 B2
(45) Date of Patent: Oct. 24, 2017

(54) MULTI-PHASE AC/AC STEP-DOWN CONVERTER FOR DISTRIBUTION SYSTEMS

(71) Applicant: ABB Technology AG, Zurich (CH)

(72) Inventors: Eddy C. Aeloiza, Apex, NC (US); Rolando P. Burgos, Blacksburg, VA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/175,461

(22) Filed: Feb. 7, 2014

(65) Prior Publication Data
US 2015/0229227 A1 Aug. 13, 2015

(51) Int. Cl.
*H02M 5/04* (2006.01)
*H02M 5/293* (2006.01)

(52) U.S. Cl.
CPC ............. *H02M 5/04* (2013.01); *H02M 5/293* (2013.01)

(58) Field of Classification Search
CPC .................. H02M 5/04; H02M 5/293; H02M 2005/2932; H02M 2001/0003; H02M 5/275; H02M 5/2932; H02M 5/42; H02M 5/45
USPC .......................................................... 363/34
See application file for complete search history.

(56) References Cited

U.S. PATENT DOCUMENTS

| | | | |
|---|---|---|---|
| 4,118,641 A | 10/1978 | Lannuzel | |
| 4,352,055 A | 9/1982 | McCartney | |
| 4,354,223 A | 10/1982 | Turnbull | |
| 5,500,575 A | 3/1996 | Ionescu | |
| 5,909,367 A | 6/1999 | Change | |
| 6,459,606 B1* | 10/2002 | Jadric | H02M 5/297 363/163 |

(Continued)

FOREIGN PATENT DOCUMENTS

EP 2523330 A2 11/2012

OTHER PUBLICATIONS

Ziogas, et al. "A Practical PWM AC Controller Topology." IEEE 1992. 880-887.

(Continued)

*Primary Examiner* — Emily P Pham
*Assistant Examiner* — Shahzeb K Ahmad
(74) *Attorney, Agent, or Firm* — Taft Stettinius & Hollister LLP

(57) ABSTRACT

A step-down AC/AC converter for use in an electric distribution system includes at least one chopper circuit for each one of a plurality of phases of the AC power, each chopper circuit including a four-quadrant switch coupled in series between primary and secondary sides of the chopper circuit and a current-bidirectional two-quadrant switch coupled between the secondary side of the chopper circuit and a common node. Each current-bidirectional two-quadrant switch is oriented in the same direction, with respect to the secondary side of the corresponding chopper circuit and the common node. The converter further includes a control circuit configured to pulse-width-modulate control inputs of the switches, to convert a first multiphase AC voltage at the primary sides of the chopper circuits to a second multiphase AC voltage at the secondary sides of the chopper circuits, the second multiphase AC voltage being lower in voltage than the first multiphase AC voltage.

13 Claims, 7 Drawing Sheets

(56) References Cited

U.S. PATENT DOCUMENTS

| | | | |
|---|---|---|---|
| 7,595,613 B2 | 9/2009 | Thompson et al. | |
| 7,768,800 B2 | 8/2010 | Mazumder et al. | |
| 7,782,643 B2 * | 8/2010 | Hara | H02M 5/293 363/148 |
| 7,834,597 B1 | 11/2010 | Shekhawat | |
| 7,848,121 B2 | 12/2010 | Kojori | |
| 7,906,866 B2 | 3/2011 | Anghel et al. | |
| 9,281,756 B2 * | 3/2016 | Divan | H02M 5/4585 |
| 2006/0103365 A1 * | 5/2006 | Ben-Yaacov | 323/313 |
| 2006/0227483 A1 * | 10/2006 | Akagi | 361/118 |
| 2010/0014325 A1 | 1/2010 | Raju et al. | |
| 2012/0243273 A1 * | 9/2012 | Rasoanarivo | H02M 5/293 363/41 |
| 2013/0241290 A1 * | 9/2013 | Higuchi et al. | 307/52 |
| 2014/0368173 A1 * | 12/2014 | Banno et al. | 323/235 |

OTHER PUBLICATIONS

Kwon et al. "Novel topologies of AC choppers." IEE proc. -Electr. Power Appl., vol. 143, No. 4. Jul. 1996. 323-330.

Cotta et al. "AC Chopper Regulation Using Power Transistors." Proceeding of Powercon 8, GI-4 Power Concepts, Inc., 1981. 1-8.

Rosas-Caro et al. "A review of AC choppers," International Conference on Electronics, Communications and Computer (CONIELECOMP). IEEE 2010. pp. 252-259.

Chen et al. "Simple Topologies for Single Phase AC Line Conditioning." IEEE Transactions on Industry Applications. vol. 30, No. 2. Mar./Apr. 1994. 406-412.

Vincenti et al. "Design and implementation of a 25-kVA three-phase PWM AC line conditioner." IEEE Transactions on Power Electronics. vol. 9, No. 4. pp. 384-389. Jul. 1994.

Choe et al. "An Improved PWM Technique for AC Choppers." IEEE Transactions on Power Electronics. vol. 4, No. 4. Oct. 1989. pp. 496-505.

Enjeti et al. "An approach to realize higher power PWM AC controller." IEEE 1993. 323-327.

Bhat et al. "A Simple Multiple Pulsewidth Modulated AC Chopper." IEEE Transactions on Industrial Electronics. vol. IE-29, No. 3. Aug. 1982. 185-189.

Jang et al. "Asymmetrical PWM Technique with Harmonic Elimination and Power Factor Control in AC Choppers." IEEE Transactions on Power Electronics. vol. 10, No. 2. Mar. 1995. 175-184.

Kwon et al. "Novel Line Conditioner With Voltage Up/Down Capability." IEEE Transactions on Industrial Electronics. vol. 49, No. 5. Oct. 2002. 1110-1119.

Peng et al. "Simple Topologies of PWM AC-AC Converters." IEEE Power Electronics Letters. vol. 1, No. 1. Mar. 2003. 10-13.

Rosas-Caro et al. "AC chopper topology with multiple steps switching capability." IEEE 2010. 1808-1815.

Ursaru et al. "Three-Phase AC Chopper with IGBT's." 7th International Conference on Development and Application Systems. Suceava, Romania. May 27-29, 2004. 159-163.

Hunyár et al. "Pulse Width Modulated IGBT AC Chopper." Periodica Polytechnica Ser. El. Eng. vol. 45, No. 3-4. 2001. pp. 159-178.

Kolar, et al. "Review of Three-Phase PWM AC-AC Converter Topologies." IEEE Transactions on Industrial Electronics. vol. 58, No. 11. Nov. 2011. 4988-5006.

* cited by examiner

| CURRENT POLARITY | | | STEP 1 TURN OFF: | STEP 2 TURN ON: | STEP 3 TURN OFF: | STEP 4 TURN ON: |
|---|---|---|---|---|---|---|
| $i_a$ | $i_b$ | $i_c$ | | | | |
| + | − | − | S1, S4, S6 | S9 | S2, S3, S4 | S7, S8 |
| − | + | + | S2, S3, S5 | S7, S8 | S1, S4, S6 | S9 |
| − | + | − | S2, S3, S6 | S8 | S1, S4, S5 | S7, S9 |
| + | − | + | S1, S4, S5 | S7, S9 | S2, S3, S6 | S8 |
| − | − | + | S2, S4, S5 | S7 | S1, S3, S6 | S8, S9 |
| + | + | − | S1, S3, S6 | S8, S9 | S2, S4, S5 | S7 |

*FIG. 11*

| CURRENT POLARITY | | | STEP 1 TURN OFF: | STEP 2 TURN ON: | STEP 3 TURN OFF: | STEP 4 TURN ON: |
|---|---|---|---|---|---|---|
| $i_a$ | $i_b$ | $i_c$ | | | | |
| + | − | − | S7, S8 | S2, S3, S4 | S9 | S1, S4, S6 |
| − | + | + | S9 | S1, S4, S6 | S7, S8 | S2, S3, S5 |
| − | + | − | S7, S9 | S1, S4, S5 | S8 | S2, S3, S6 |
| + | − | + | S8 | S2, S3, S6 | S7, S9 | S1, S4, S5 |
| − | − | + | S8, S9 | S1, S3, S6 | S7 | S2, S4, S5 |
| + | + | − | S7 | S2, S4, S5 | S8, S9 | S1, S3, S6 |

*FIG. 12*

MULTI-PHASE AC/AC STEP-DOWN CONVERTER FOR DISTRIBUTION SYSTEMS

GOVERNMENT RIGHTS

This invention was made with Government support under ARPA-E Cooperative Agreement DE-AR0000141 awarded by the Department of Energy (DOE). The Government has certain rights in this invention.

TECHNICAL FIELD

The present disclosure relates to step-down AC/AC converters in electric distribution systems.

BACKGROUND

In alternating-current (AC) power distribution systems, line-frequency transformers are often use to step down the voltage. Increasingly, renewable sources of energy, such as wind turbines, solar farms, etc., are connected to the distribution network, so as to allow the transfer of large blocks of power to and from the network. Interest in energy storage systems, where excess available electrical power can be stored for later use, is also growing. In any of these applications, line-frequency transformers may be needed to step down a medium voltage (MV), e.g., between 1 kV and 72.5 kV, to a lower voltage supported by a grid-tie converter or inverter.

In these applications, the MV system may generally be assumed to be a stiff voltage source, compared with the grid-tie converter. The line-frequency transformer thus also serves to condition the voltage supplied by the grid-tie converter to that of the MV distribution.

Typical line-frequency transformers and conversion systems based on high/medium frequency transformers suitable for use in these applications are bulky, heavy, and/or expensive. In addition, line-frequency transformers built using conventional technology do not provide for dynamic control of the voltage or automatic disconnection from the source when a fault occurs. Accordingly, improved step-down AC/AC converters are needed for use in these applications.

SUMMARY

Embodiments of the present invention provide step-down AC/AC converters for use in electric distribution systems. The disclosed converters may be used to replace bulky line frequency transformers in systems where grid-tie converter are present or needed, such as utility-scale energy storage systems, photovoltaic systems, wind generation systems and fast electric vehicle chargers. The disclosed systems allow for step-down of multi-phase (e.g., 3-phase) voltage from a medium (MV) distribution level to a low-range MV or low voltage level, without the use of bulky line-frequency transformers or high-frequency or medium frequency transformers.

The disclosed converters are based on a modified 3-phase AC chopper, and can provide several benefits over existing approaches, including: a) electric isolation from the distribution system in the event of a secondary fault condition, b) dynamic control of the 3-phase secondary voltage for voltage regulation purposes, c) reduced secondary-side common-mode voltage, e) and high power-quality characteristics.

In one example, a step-down converter for converting multi-phase alternating current (AC) power includes at least one chopper circuit for each one of a plurality of phases of the AC power. Each chopper circuit includes a four-quadrant switch coupled in series between primary and secondary sides of the chopper circuit, and further includes a current-bidirectional two-quadrant switch having a first end coupled between the secondary side of the chopper circuit and a node that is common to all of the chopper circuits. Each of these current-bidirectional two-quadrant switches is oriented in the same direction, with respect to the secondary side of the corresponding chopper circuit and the common node. The step-down converter further includes a control circuit connected to the chopper circuits and configured to pulse-width-modulate control inputs of the four-quadrant switches and the current-bidirectional two-quadrant switches, to convert a first multiphase AC voltage at the primary sides of the chopper circuits to a second multiphase AC voltage at the secondary sides of the chopper circuits, the second multiphase AC voltage being lower in voltage than the first multiphase AC voltage.

In some embodiments, the four-quadrant switch in each chopper circuit includes a first pair of integrated-gate bipolar transistor (IGBT) devices including antiparallel freewheeling diodes and connected in a back-to-back configuration. In some of these embodiments, the four-quadrant switch in each chopper circuit comprises a second pair of IGBT devices connected in a back-to-back configuration and coupled in series with the first pair of IGBT devices, each of the second pair comprising an antiparallel freewheeling diode.

The current-bidirectional two-quadrant switches in some embodiments may each consist of a single integrated-gate bipolar transistor (IGBT) device including an antiparallel freewheeling diode. In other embodiments, each of the current-bidirectional two-quadrant switches comprises two or more integrated-gate bipolar transistor (IGBT) devices including antiparallel freewheeling diodes, where the two or more IGBT devices are connected in series and oriented in the same direction with respect to the secondary side of the corresponding chopper side and the common node.

Each phase of the step-down converter may include two or more chopper circuits arranged in parallel, with respect to their primary and secondary sides, in some embodiments, thus providing additional power-handling capability without requiring larger semiconductor devices.

Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings:

FIGS. 11 and 12 illustrate example switching sequences corresponding to each possible combination of load current polarities.

DETAILED DESCRIPTION

Figure 1:
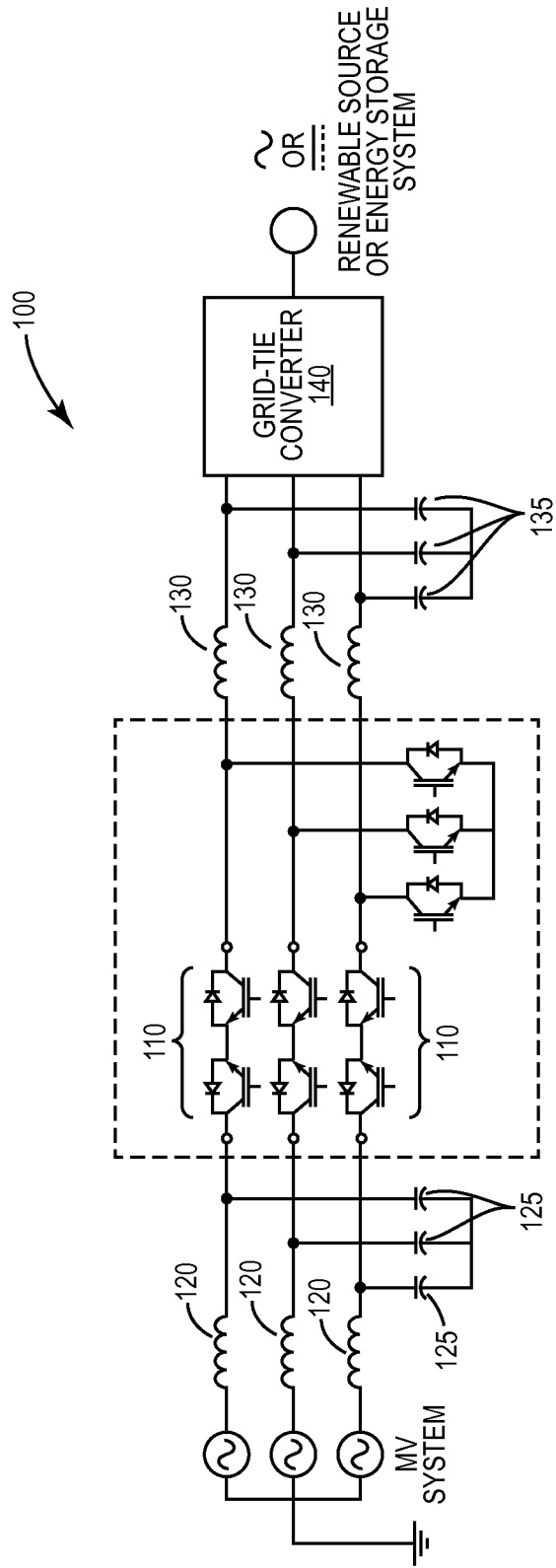
FIG. 1 is a schematic diagram illustrating an example three-phase step-down converter according to some embodiments of the present invention.

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

As discussed above, improved step-down AC/AC converters are needed for use in several applications, including applications involving grid-tie converters that are capable to supply active or reactive power free of harmonics, where a line-frequency transformer is needed to condition the voltage to that of a medium-voltage (MV) distribution system. The MV system in these applications is assumed to be a stiff voltage source compared with the grid-tie converter. Under these conditions, the step-down converter needs to be capable of stepping down the voltage from the distribution level to a level that the grid-tie converter can handle, and transferring active and reactive power free of harmonic, with the power factor controlled by the grid-tie converter.

The step-down converters described in detail below, an example of which is pictured in FIG. 1, allow for the stepping down of multi-phase (e.g., three-phase) voltage without the use of bulky line-frequency transformers or high/medium frequency transformers. These converters are based on a modified multi-phase AC chopper circuit, and can provide several benefits, including electric isolation from the distribution system in the event of a secondary fault condition, dynamic control of the secondary voltage for voltage regulation purposes, reduced secondary side common mode voltage, and high power-quality characteristics (i.e., low input current and output voltage total harmonic distortion, and near-unity power factor). These converters are suitable for use in varied applications, including energy storage systems, photovoltaic systems, wind generation systems, and fast electric vehicle charger systems.

In many of these applications, e.g., where a renewable source of energy or energy storage system is configured to provide large blocks of power to a MV electric distribution system, a line-frequency transformer to step down the voltage is usually needed. These transformers are often bulky, heavy and costly. Replacing bulky, low-frequency, magnetic devices with a structure that is primarily semiconductor-based will allow for reduced weight and volume. The compact, lightweight devices described herein are thus suitable for deployment in a wide variety of environments, such as in wind generator towers, aircraft, ships, off-shore platforms, and highly densely populated areas where real estate costs make the utilization of conventional line-frequency transformers prohibitive.

The converters described herein also provide advantages such as voltage controllability and fault disconnection—conventional line-frequency transformers do not provide dynamic control of the voltage nor disconnection from the source when a fault occurs.

Figure 2:
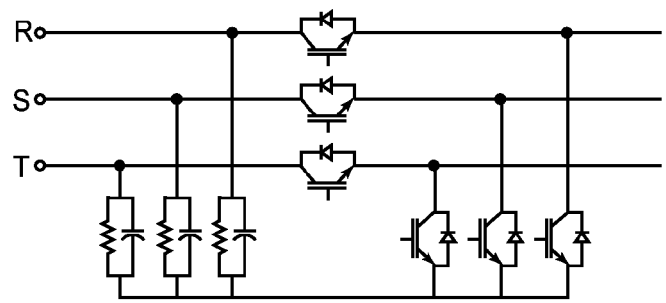
FIGS. 2, 3, and 4 illustrate conventional AC chopper circuits.

The converters described herein are based on a modified multi-phase AC chopper structure. Previously, AC choppers have been used primarily for voltage conditioning. A typical topology for a three-phase application is based on an arrangement of three integrated-gate bipolar transistors (IGBTs) on the primary side of the converter, with three IGBTs providing a free-wheeling path on the secondary side of the converter. An example of this topology is illustrated in FIG. 2. This approach has the disadvantage of generating a common mode voltage that is as large as the input level, with large dV/dt. This makes necessary the utilization of galvanic isolation, in the event that the secondary voltage belongs to a different voltage class.

Figure 3:
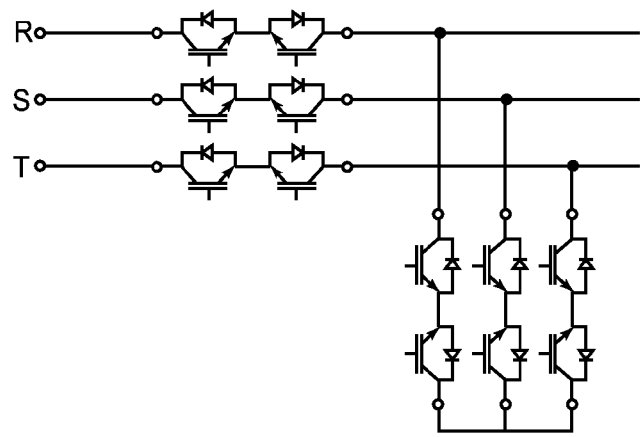

Other similar topologies employ a set of three bidirectional switches in the primary side, composed of back-to-back series IGBTs and a set of identical bidirectional switches for the secondary free-wheeling path. An example of this topology is shown in FIG. 3. While this topology allows for independent voltage control of each phase and can theoretically remove the common mode voltage, it duplicates the number of semiconductors in both the primary side and in the freewheeling path, making it more complex and costly.

Figure 4:
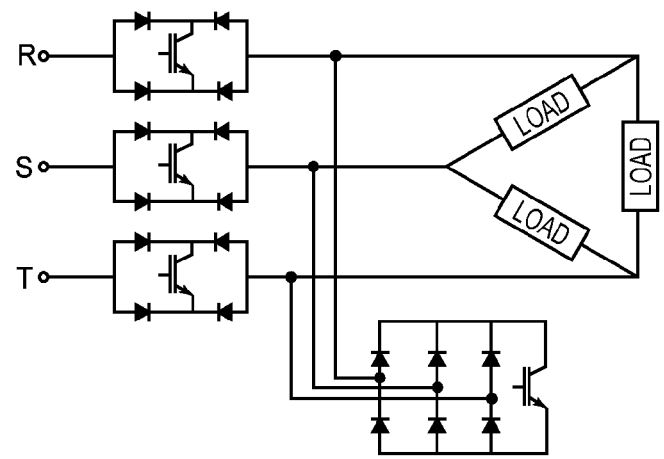

Still another approach, an example of which is shown in FIG. 4, employs three bidirectional switches based on a single-phase diode bridge and a transistor for the primary side, and includes a freewheeling path comprising a 6-diode rectifier and one transistor. In this approach, the freewheeling path requires a relatively large number of semiconductor devices. Also, during active mode, the primary side involves three switching devices per phase in the current-critical path, compared to two in the configuration shown in FIG. 3, resulting in higher conduction and switching losses.

The converter circuit shown in FIG. 1 addresses all of these shortcomings by employing a set of three IGBT-based four-quadrant switches for the primary side and a set of three IGBTs for the secondary free-wheeling path. This improves the semiconductor utilization, compared to the topologies shown in FIGS. 3 and 4. Further, the illustrated circuit allows for reduction or removal of the common mode voltage.

More specifically, FIG. 1 illustrates a step-down converter 100 for converting multi-phase AC power—in this case, 3-phase power. Step-down converter 100 comprises a chopper circuit corresponding to each of the three phases. Each of these chopper circuits has a four-quadrant switch 110 coupled in series between the primary and secondary sides of the chopper circuit. In the pictured circuit, each of the four-quadrant switches 110 includes a pair of IGBT devices, the IGBT devices including antiparallel freewheeling diodes. The IGBT devices in each pair are connected in a back-to-back configuration, to provide a four-quadrant switching capability. It will be appreciated that other configurations for four-quadrant switches are possible.

The chopper circuit for each phase further includes a current-bidirectional, two-quadrant, switch coupled between the secondary side of the chopper circuit and a common node. In the illustrated circuit, the two-quadrant switches are each implemented using a single IGBT device with an anti-parallel freewheeling diode. Each of these switches is oriented in the same direction, with respect to the common node and the secondary sides of the corresponding chopper circuits. Once again, it will be appreciated that other configurations for the current-bidirectional two-quadrant switches are possible.

Switching harmonics on the primary and secondary sides are suppressed by filters, made up in this case by series inductors 120 and parallel capacitors 125 on the primary sides of the chopper circuit, and series inductors 130 and parallel capacitors 135 on the secondary sides. More elaborate filter configurations may be used, in some configurations, including multi-stage R-L-C (resistor-inductor-capacitor) networks.

Step-down converter 100 converts a primary-side voltage, which may be a medium voltage (MV) of between 1 kV and 72.5 kV, for example, to a lower voltage, e.g., to a voltage suitable for coupling to a grid-tie converter. In the pictured configuration, the secondary sides of the chopper circuits are coupled, through the secondary side filters, to a grid-tie converter 140. Grid-tie converter 140 may convert the secondary-side voltage to an AC voltage or to a DC voltage, depending on the application.

The configuration illustrated in FIG. 1 and described above offers several advantages. First, its use of semiconductor devices permit an efficient stepping down of the distribution voltage without the need for heavy and bulky line-frequency transformers, and without the use of multiple rectification and inversion stages and high- or medium-frequency transformer structures. Second the relatively simply topology uses a small number of semiconductor switching device, allow for a simple control strategy as well as for high-efficiency operation. Further, operating the illustrated circuit at a relatively high switching frequency, e.g., at 2-15 kHz, allows the filter components to be reduced in size.

Another advantage of the illustrated configuration is that the MV distribution system can be readily isolated from the grid-tie converter, using the normal switching functions of the semiconductor devices, in the event of a fault on either side of the step-down converter. The illustrated step-down converter reduces the secondary-side common mode voltage, e.g., compared to the converter topology shown in FIG. 2. Provided that in the low voltage side, the current is free of harmonics and the power factor is near unity, the converter also provides for high power-quality characteristics, as in low total harmonic distortion for input currents and output voltages, as well as near unity power factor.

Figure 5:
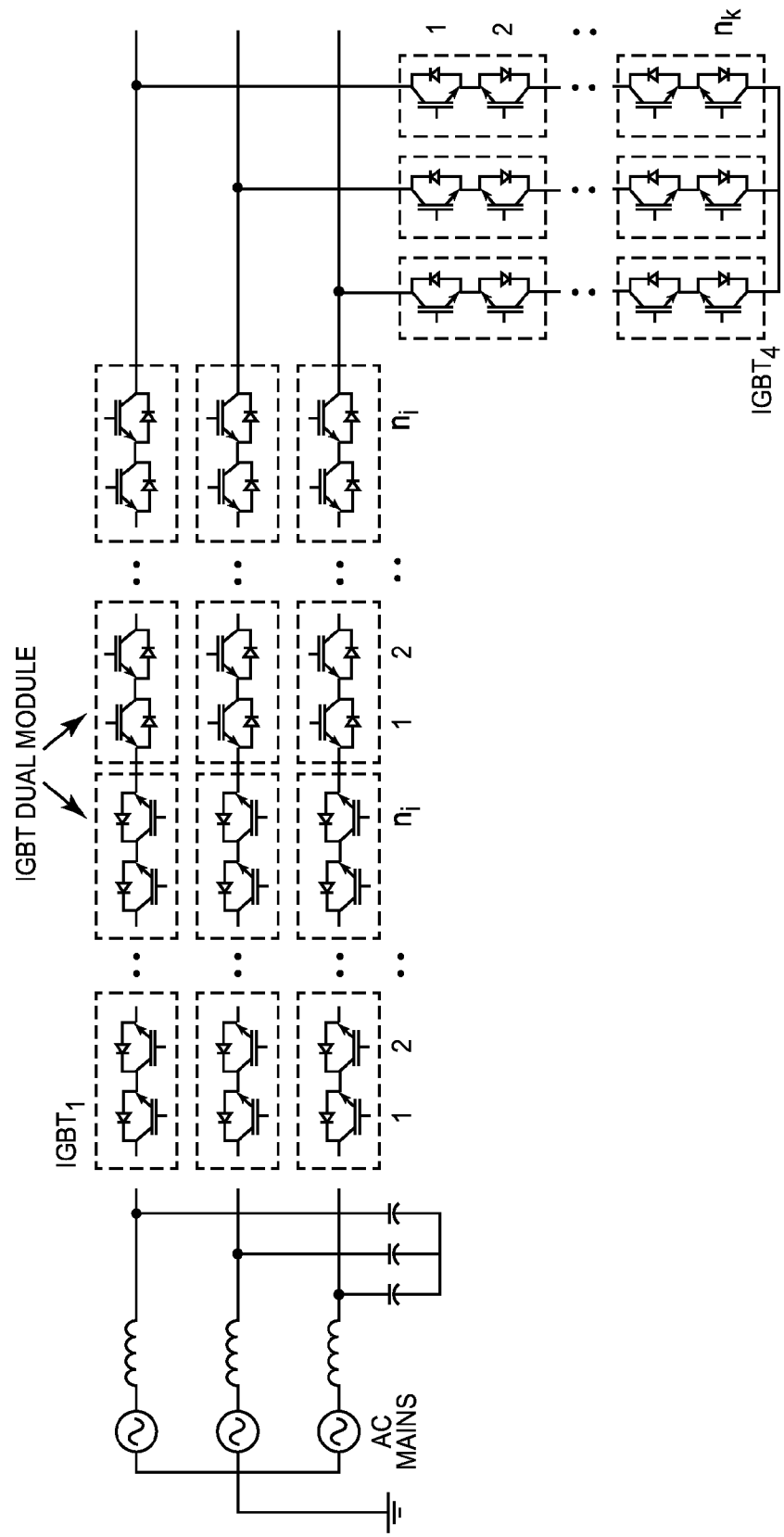
FIG. 5 is a schematic diagram illustrating another example of a three-phase step-down converter according to the present invention.
Figure 6:
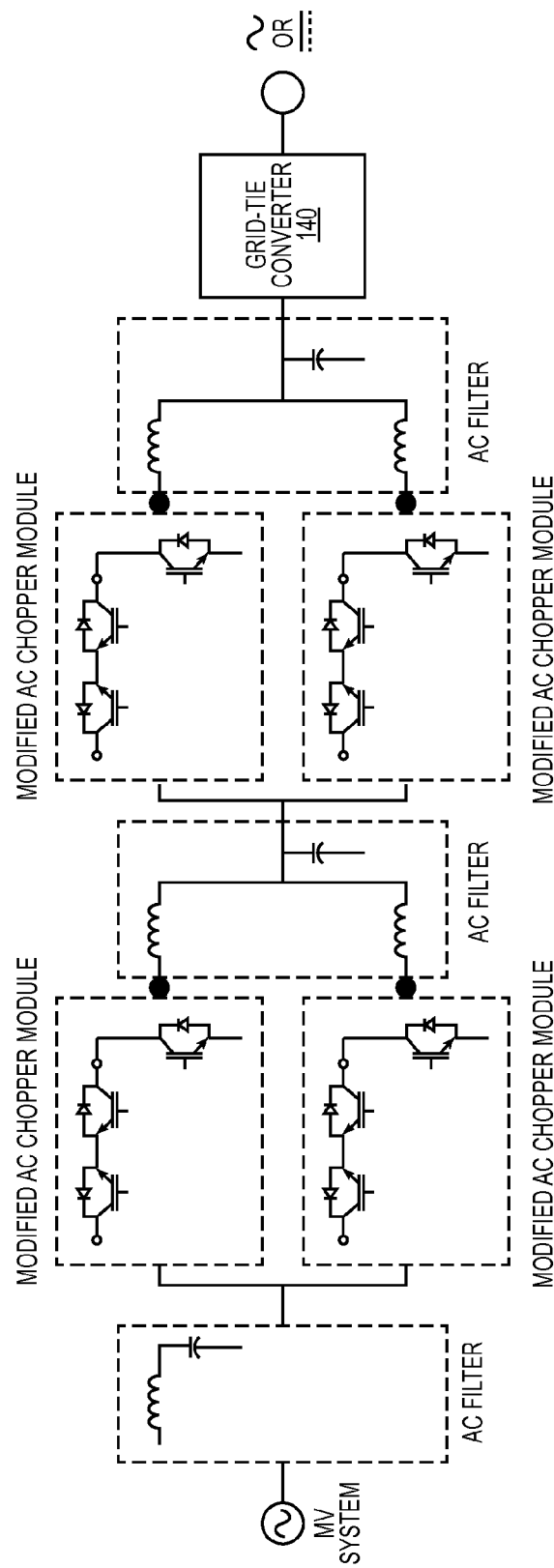
FIG. 6 illustrates a step-down converter having two modules in parallel and two sets of modules in cascade.

The chopper circuit shown in each phase of the step-down converter 100 in FIG. 1 can be modified to allow for higher efficiencies and higher voltage- and current-handling capabilities, without necessarily increasing the size of the individual devices. A range of possible modifications are shown in FIGS. 5 and 6. First, the series path on the primary side of each chopper circuit may comprise multiple four-quadrant switches, to increase the voltage-handling capability of the circuit. One approach, for example, is to incorporate multiple pairs of back-to-back IGBTs, each having an anti-parallel freewheeling diode. A variant of this approach is to include two (or more) pairs of IGBT devices, as seen with dual-IGBT modules 510, where at least a first pair is oriented in one direction and at least a second pair is oriented in the opposite direction.

Second, the voltage-handling capabilities of the freewheeling path on the secondary side of the chopper circuit may be boosted in a similar manner, e.g., by increasing the number of current-bidirectional two-quadrant switches in each parallel path. In each freewheeling path, however, the current-bidirectional two-quadrant switches must be oriented in the same direction, with respect to the common node and the secondary sides of the chopper circuits. In FIG. 5, the voltage-capability of the freewheeling paths is increased through the use of additional IGBT devices, in particular the use of two or more dual-IGBT modules 510.

As shown in FIG. 6, the efficiency and current-handling capacity of the step-down converter may be increased by arranging two (or more) chopper circuits in parallel, with respect to their primary and secondary sides, for each phase. This parallel connection allows each individual chopper circuit to be run at a lower switching frequencies, by interleaving the switching signals supplied to the chopper circuits, thus increasing the effective input switching frequency and improving the operating efficiency. To reduce the voltage-handling requirements for each chopper circuit and/or to allow each chopper circuit to be operated at a higher duty cycle and thus more efficiently, two (or more) step-down converters may also be arranged in cascade, as is also shown in FIG. 6. In FIG. 6, only one phase for each step-down converter 100 is explicitly illustrated; it should be appreciated that these step-down converters 100 are connected to one another and to the intervening filter circuits 610 on a phase-by-phase basis.

In the chopper circuits shown in FIGS. 1, 5, and 6, the AC voltage in each chopper circuit is "chopped" at a relatively high frequency, e.g., 2-15 kHz, at a duty cycle that is selected to produce the desired step-down in voltage. The chopped voltage is filtered by L-C circuits to remove the high-frequency components while preserving the 50- or 60-Hz fundamental component. Note that the secondary voltage can be adjusted to be a particular fraction of the primary voltage by regulating the duty cycle of the control signals that switch on and off the four-quadrant and current-bidirectional two-quadrant switches of the illustrated circuits.

To minimize or eliminate the utilization of snubber circuits for managing transient voltages, a multi-phase multiple-step switching technique may be utilized to transfer the current from the multi-phase primary set of switches to the multi-phase secondary set of switches. This technique allows for safe commutation transition, avoiding catastrophic short circuit and interruption of inductive load currents. This multiple-step switching technique can be accomplished by either monitoring the multi-phase input voltage polarity or monitoring the polarity of the multi-phase output current—either method is applicable.

Connected to the switching elements in the circuits of FIGS. 1, 5, and 6, but not illustrated in those figures, are control circuits configure to pulse-width modulate the control inputs of the four-quadrant switches and the current-bidirectional two-quadrant switches so as to convert the multi-phase AC voltage at the primary sides of the chopper circuits to a second multi-phase AC voltage at the secondary sides.

Figure 7:
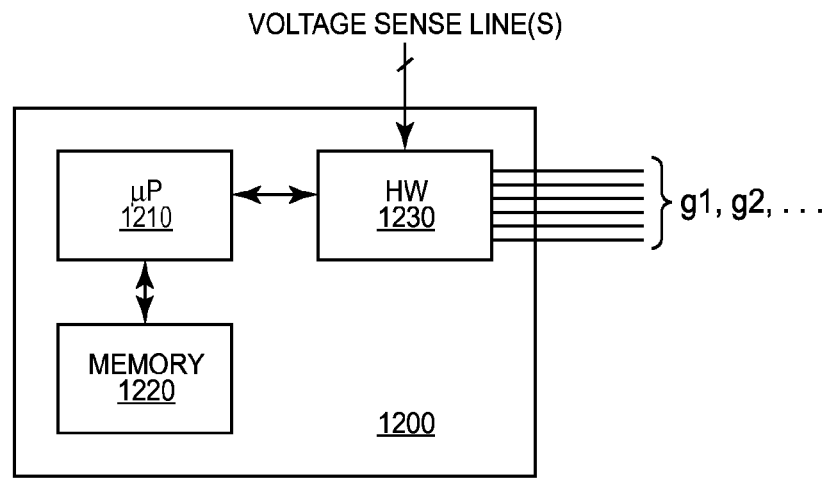
FIG. 7 illustrates an example control circuit according to some embodiments of the present invention.

The control circuit providing these control signals can be an appropriately programmed microcontroller, or the like; an example of such a control circuit 1200 is shown in FIG. 7, which includes a microprocessor 1210, memory 1220, and digital/analog hardware circuit 1230. In the illustrated control circuit 1200, hardware circuit 1230 outputs a set of gate control voltages g1, g2, . . . , each of which corresponds to one or more switching elements in one of the step-down converter circuits described above. In the illustrated circuit, feedback from the multi-phase voltage input and/or from the multi-phase stepped-down voltage at the output of the step-down convertor is provided via the "VOLTAGE SENSE LINE(S)." This feedback allows for voltage polarity sensing at the input, so that the switching can be controlled to prevent short circuits and interruptions of inductive load currents, as briefly discussed, and/or for voltage-magnitude sensing at the output to allow for regulation of the output. In some embodiments, current sensing lines from the outputs of the chopper circuits may be provided, in addition to or instead of the voltage sensing lines, to allow for switching control based on sensing the polarities of the output currents. Hardware 1230 thus may include one or more analog-to-digital (A/D) converters, in some embodiments, to convert the analog signals on the one or more voltage sense lines and/or current sense lines to digital signals suitable for use by microprocessor 1210. Of course, variants of the circuit illustrated in FIG. 7 may employ a microcontroller device that incorporates not only a processor element but one or more A/D converters, in which case A/D converters need not be provided in separate hardware.

Microprocessor 1210 is configured, using program instructions stored in memory 1220, to pulse-width modulate the control inputs of the four-quadrant switches and the current-bidirectional two-quadrant switches so as to convert the multi-phase AC voltage at the primary sides of the chopper circuits to a second multi-phase AC voltage at the secondary sides. Memory circuit 1220 may comprise one or several memory devices and/or memory types, such as flash memory or other non-volatile memory, random-access memory (RAM), read-only memory (ROM), etc.

It will be appreciated that the control circuit shown in FIG. 7 is but one example of a circuit that can be adapted to control a step-down converter like those described herein. The illustrated control circuit can be readily adapted to support additional functions, such as an automatic disabling of the step-down converter in response to detecting that a fault has occurred. In such a case, information or signaling indicating a fault on either side of the step-down converter may trigger the control circuit to turn off all four-quadrant switching devices and turning on all two-quadrant freewheeling switching devices, thus isolating the grid-tie converter on the secondary side from the distribution grid on the primary side.

In order to minimize or eliminate the utilization of snubber circuits, a multiple-step switching technique can be utilized to transfer the current from the four-quadrant switching devices to the two-quadrant freewheeling switching devices. This technique allows for safe commutation transition, avoiding catastrophic short circuit and interruption of inductive load current. The multiple-step switching technique can be accomplished by either monitoring the multi-phase input voltage polarity or the polarity of the multi-phase output current. Either method is applicable. The transition time between each step depends mainly on the switching devices' rise times, on-delay times and fall times. Typically, it could be between 0.2 us and 1.5 us In a three-phase circuit that employs IGBTs, like the circuits shown in FIGS. 1, 5, and 6, a multiple-step switching technique can be used that is similar to one described in U.S. Pat. No. 6,459,606 (hereinafter referred to as the '606 patent), issued Oct. 1, 2002, the entire contents of which are incorporated herein by reference. That document describes a four-step process, where each step includes turning on or off one of two two-quadrant switches in the primary side of a chopper circuit or one of two two-quadrant switches on the secondary side.

This four-step process can be modified for the circuit of FIG. 1, where each step includes turning on or off one of two IGBTs 115 on the primary side of the chopper circuit or turning on or off the single IGBT 115 on the secondary side. For circuits involving multiple switching elements in series, like the circuit in FIG. 5, the technique is extended so that each of the similarly oriented switching devices in a given leg is simultaneously switched on or off, in each step. When multiple step-down converters are operated in cascade, as shown in FIG. 6, the control of each may be independent or in lock-step. When multiple step-down converters are in parallel, as also shown in FIG. 6, the control of the parallel converters may be performed in an interleaved fashion.

In any of these scenarios, the switching is performed in such a way that the input voltage sources are never directly shorted to one another (without an impedance to limit the current), and the inductive load current is never interrupted. Further, the time interval between any two consecutive switching steps is long enough to allow the switching devices to turn completely on or off.

As described in the '606 patent, the converter operates by detouring the multi-phase load currents from the converter series branches, in the converter "ON" state, to the converter's shunt branches, in the converter "OFF" state. This switching, and the reverse switching to restore the converter to the ON state, is performed at the beginning and end of each duty cycle. Because of the finite switching times of a practically realizable switch, the switching between the ON and OFF states cannot be done by switching all of the involved switching elements simultaneously. Instead, the switching must be carried out in a particular sequence, to avoid the short circuiting or current interruptions mentioned above. This is particularly true when the individual switch elements are not capable of blocking current in both directions, as is the case with the IGBT devices illustrated in FIGS. 1, 5, and 6.

Figure 8:
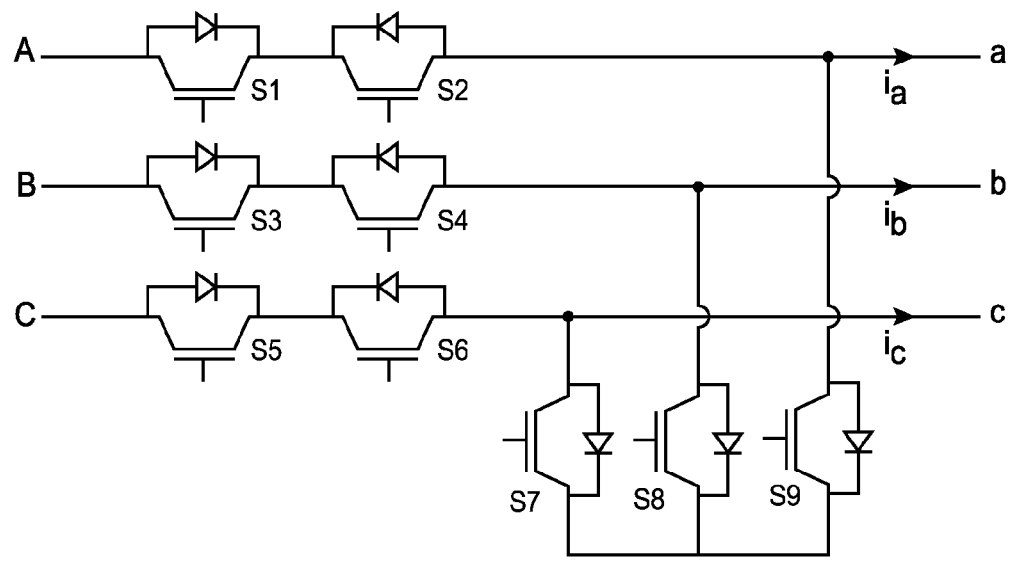
FIG. 8 illustrates a 3-phase step-down converter having a minimum number of IGBT-based switching devices.

FIG. 8 illustrates a 3-phase step-down converter having a minimum number of IGBT-based switching devices, labeled S1-S9. Load currents $i_a$, $i_b$, and $i_c$ are also shown in the figure. It should be appreciated that the circuit in this figure is similar to that of FIG. 1, but has the switches in the shunt paths oriented differently. Special attention must be paid to the sequence steps depending on the orientation of the shunt switches as shown below. A step-down converter according to the present invention may have shunt switches oriented in either direction, with appropriate adjustments to the switching sequences, to avoid the current interruptions discussed above.

In a three-phase converter as illustrated in FIG. 8, given a balanced load, the current waveform during a single line cycle can be divided into six intervals. In each consecutive interval, a different one of the output phase currents differs in polarity from the remaining two. The '606 patent explains that it is not necessary to turn the switch in every shunt branch to short the output currents, for the circuit configuration shown therein. The topology of the circuits described herein differs from that discussed in the '606 patent, but a similar insight applies here. If the switches in the shunt paths are oriented in the direction shown in FIG. 8, only the switch or switches in the shunt branch that has the opposite polarity from the other two branches in a given interval needs to be turned on, to short the output currents. (If oriented in the opposite direction, then the switches in the two shunt branches that differ in polarity from the remaining one need to be turned on to short the output currents for a given interval.) Following the lead from the '606 patent, that branch (or branches) will be referred to here as the "active shunt branch." It should be appreciated that, in general, the switches in the shunt branch that need to be turned on for a given interval are those which will be able to conduct the load side current. Given the switch configuration shown in FIG. 8, those are the switches for which the load current is positive, i.e., I>0. The switch configuration shown in FIG. 1 differs; in this case, the switches that need to be turned on for a given interval are those for which the load current is negative, i.e., I<0.

In the series branches of the circuits shown in FIGS. 1, 5, 6, and 10, there are IGBT devices oriented in opposite directions. Again following the lead of the '606 patent, those devices having anti-parallel diodes that allow a particular current polarity are referred to as "redundant switches" with respect to that current polarity. The other devices, having anti-parallel diodes that block a particular current polarity, are "necessary switches," with respect to that current polarity.

Figure 9:
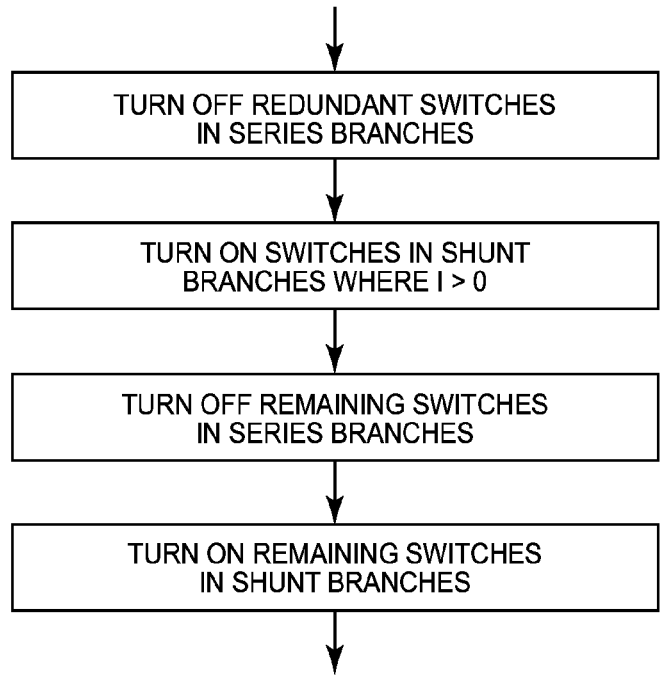
FIG. 9 is a process flow diagram illustrating an example ordered procedure for transitioning from a converter ON state to a converter OFF state.
Figure 10:
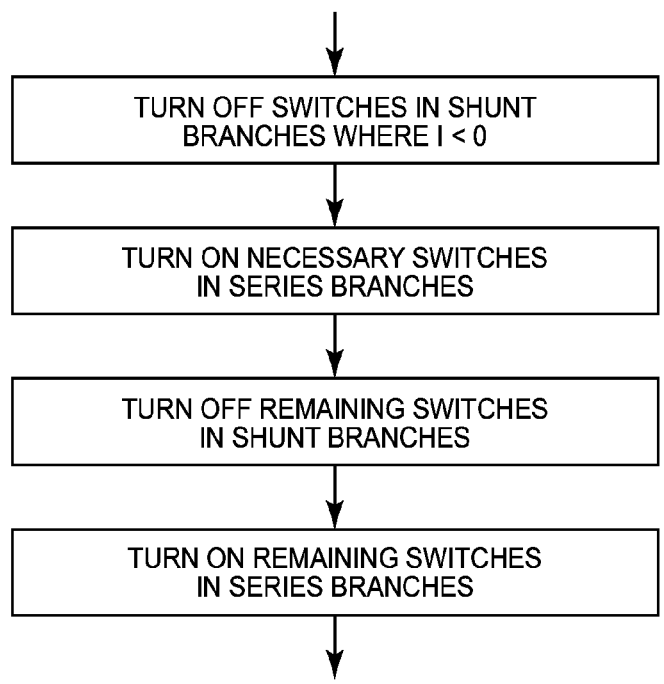
FIG. 10 is a process flow diagram illustrating an example ordered procedure for transitioning from a converter OFF state to a converter ON state.

Given this terminology, an example ordered procedure for transitioning from a converter ON state to a converter OFF state is illustrated in FIG. 9. Likewise, the corresponding ordered procedure for transitioning from a converter OFF state to a converter ON state is shown in FIG. 10. Note that these figures illustrate a procedure for a circuit in which the shunt switches are oriented in the directions shown in FIG. 8. If the shunt switches face in the other direction, than the various references in FIGS. 9 and 10 to "I>0" and "I<0" should be swapped. It should be further noted that FIGS. 9 and 10 illustrate a current-polarity-based approach. It will be appreciated that corresponding voltage-polarity-based approaches are also possible.

FIGS. 11 and 12 illustrate in more detail the ON-to-OFF and OFF-to-ON switching sequences shown in FIGS. 9 and 10, respectively—FIGS. 11 and 12 indicate the switching sequences corresponding to each possible combination of load current polarities.

It will be appreciated that the switching sequences illustrated in FIGS. 9-12 may be readily implemented in a control circuit like that illustrated in FIG. 7, or in a variety of other control circuits. When additional switching elements are included in a given series or shunt paths, as shown in FIG. 5, for example, those additional switching elements are switched in lockstep with other switching elements in the same branch and having the same polarity. As noted above, step-down converters operated in cascade, as shown in FIG. 6, may be independently pulse-width modulated or operated in lockstep. Step-down converters operated in parallel, as shown in FIG. 6, may be controlled in an interleaved fashion, so that each parallel converter circuit is switched from ON-to-OFF and OFF-to-ON at the same rate but at different, interleaved, times. It will be further appreciated that the switching techniques detailed above may be extended to multi-phase circuits other than 3-phase circuits.

With the above-described circuits, systems, methods, and other variations and extensions in mind, those skilled in the art will appreciate that the foregoing description and the accompanying drawings represent non-limiting examples of the systems and apparatus taught herein. As such, the present invention is not limited by the foregoing description and accompanying drawings. Instead, the present invention is limited only by the following claims and their legal equivalents.

What is claimed is:

1. A step-down converter for converting multi-phase alternating current (AC) power, the step-down converter comprising:
   a plurality of chopper circuits each coupled to one of a plurality of power distribution lines, each chopper circuit comprising a first switch including two two-quadrant switches coupled in series between a primary side and a secondary side of one distribution line, each chopper circuit further comprising a second switch consisting of one two-quadrant switch having a first end coupled to the first switch and a second end of the second switch coupled to a common node; and
   a control circuit coupled to the first switches and the second switches of the plurality of chopper circuits and configured to receive an alternating current measurement corresponding to each of the plurality of distribution lines, generate a coordinated pattern of control inputs using the alternating current measurements, and transmit the plurality of control inputs to the first switches and second switches of the plurality of chopper circuits so as to:
      open half of the two-quadrant switches of the first switches,
      close at least one but not all of the second switches,
      open the other half of the two-quadrant switches of the first switches, and
      close the other second switches.

2. The step-down converter of claim 1, wherein the first switch in each chopper circuit comprises a first integrated-gate bipolar transistor (IGBT) and an antiparallel freewheeling diode connected in a back-to-back configuration.

3. The step-down converter of claim 2, wherein the first switch in each chopper circuit comprises a second IGBT and an antiparallel freewheeling diode coupled in series with the first IGBT devices, each of the second pair comprising an antiparallel freewheeling diode.

4. The step-down converter of claim 1, wherein the distribution line includes a tertiary side and the step-down converter comprises two chopper circuits coupled to each distribution line, the first of the chopper circuits being coupled between the primary side of the distribution lines and the secondary side of the distribution lines, and the second of the chopper circuits being coupled between the secondary side of the distribution lines and the tertiary side of the distribution lines.

5. A step down converter for converting multi-phase alternating current (AC) power, the step-down converter comprising:
   a chopper circuit for each one of the plurality of phases of the AC power, each chopper circuit comprising a four-quadrant switch including two two-quadrant switches coupled in series between primary and secondary sides of the chopper circuit, each chopper circuit further comprising a single current-bidirectional two-quadrant switch having a first end coupled to the secondary side of the chopper circuit and a second end of each of the current-bidirectional two-quadrant switches coupled to a common node; and
   a control circuit connected to the chopper circuits and configured to receive an electric characteristic measurement corresponding to each phase of the AC power, to generate a coordinated pattern of control inputs using the electric characteristic measurement, and to transmit the control inputs to the four-quadrant switches and the current bidirectional two-quadrant switches so as to:
      open half of the two-quadrant switches of the four-quadrant switches, close at least one but not all of the current-bidirectional two-quadrant switches, open the other half of the two-quadrant switches of the four-quadrant switches, and close the remaining open current-bidirectional two-quadrant switches, wherein each of the current-bidirectional two-quadrant switches are connected in series and oriented in the same direction with respect to the secondary side of the corresponding chopper side and the common node.

6. The step-down converter of claim 5, wherein the four-quadrant switch in each chopper circuit comprises a first pair of integrated-gate bipolar transistor (IGBT) devices including antiparallel freewheeling diodes and connected in a back-to-back configuration.

7. The step-down converter of claim 6, wherein the four-quadrant switch in each chopper circuit comprises a second pair of IGBT devices connected in a back-to-back configuration and coupled in series with the first pair of IGBT devices, each of the second pair comprising an antiparallel freewheeling diode.

8. The step-down converter of claim 5, wherein the step-down converter comprises at least two chopper circuits for each phase, the at least two chopper circuits being connected in parallel with respect to their primary and secondary sides.

9. A method for operating an AC power system having an initial voltage and a final voltage, the method comprising:

coupling a plurality of first switches including two two-quadrant switches to a plurality of distribution lines each including a primary side coupled to the plurality of first switches and a secondary side coupled to the plurality of first switches;

coupling a plurality of second switches containing a single two-quadrant switch between each of the plurality of first switches and a common node;

measuring an electrical characteristic of each of the plurality of distribution lines;

opening a first set of the plurality of second switches in response to measuring the electric characteristic of each of the plurality of distribution lines;

closing a first half of the two-quadrant switches of the plurality of first switches;

opening a second set of the plurality of second switches;

closing the other half of the two-quadrant switches of the plurality of first switches;

waiting a period of time;

opening the other half of the two-quadrant switches of the plurality of first switches;

closing the second set of the plurality of second switches;

opening the first half of the two-quadrant switches of the plurality of first switches;

closing the first set of the plurality of second switches;

wherein the second set of the plurality of second switches includes all of the switches of the plurality of second switches not included in the first set of the plurality of second switches.

10. The method of claim 9 wherein the electrical characteristic is current polarity.

11. The method of claim 10 wherein the first set includes the switches corresponding to the distribution lines having a positive current polarity.

12. The method of claim 9 wherein the period of time between closing the second set of the plurality of switches and opening the second set of the plurality of second switches corresponds to a reduction in voltage between the initial voltage of the AC power and the final voltage of the AC power.

13. The system of claim 9 wherein the electric characteristic is current polarity and the first set of the plurality of second switches includes the portion of the second switches coupled to distribution lines having a positive polarity.

* * * * *